March 15, 1949.    R. R. WYLAND    2,464,475
LINK-AND-LEVER ROAD VEHICLE SUSPENSION
Filed Sept. 16, 1947    4 Sheets-Sheet 2
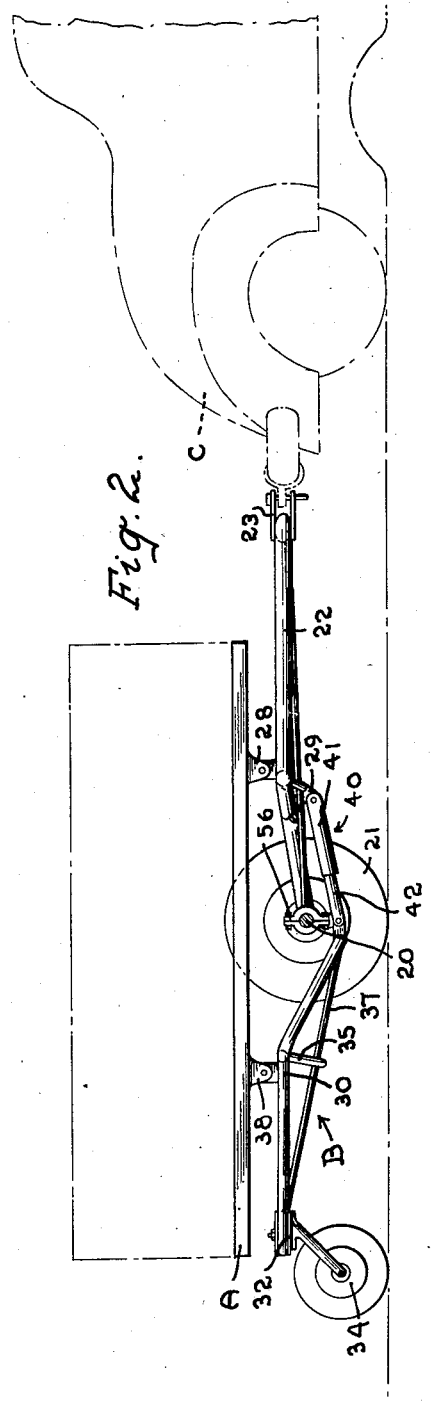
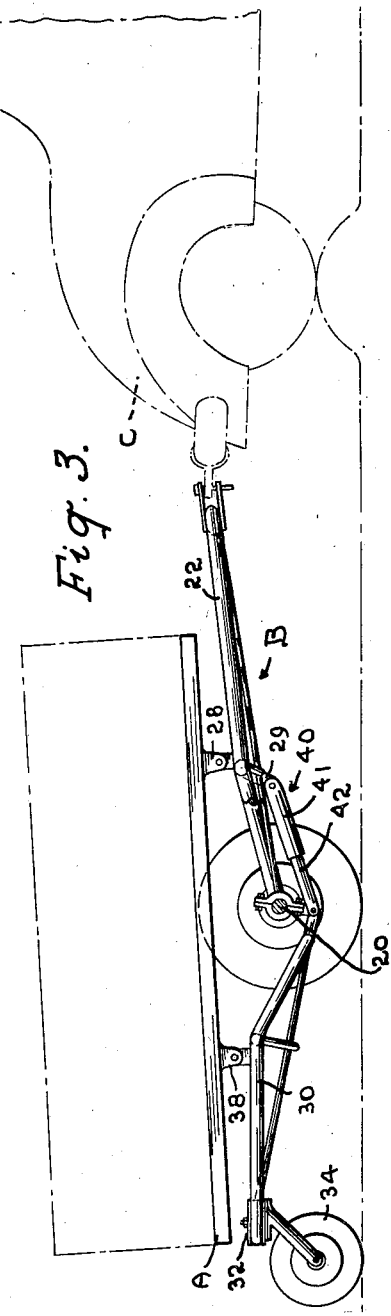
INVENTOR.
RICHARD R. WYLAND
BY
ATTORNEYS.

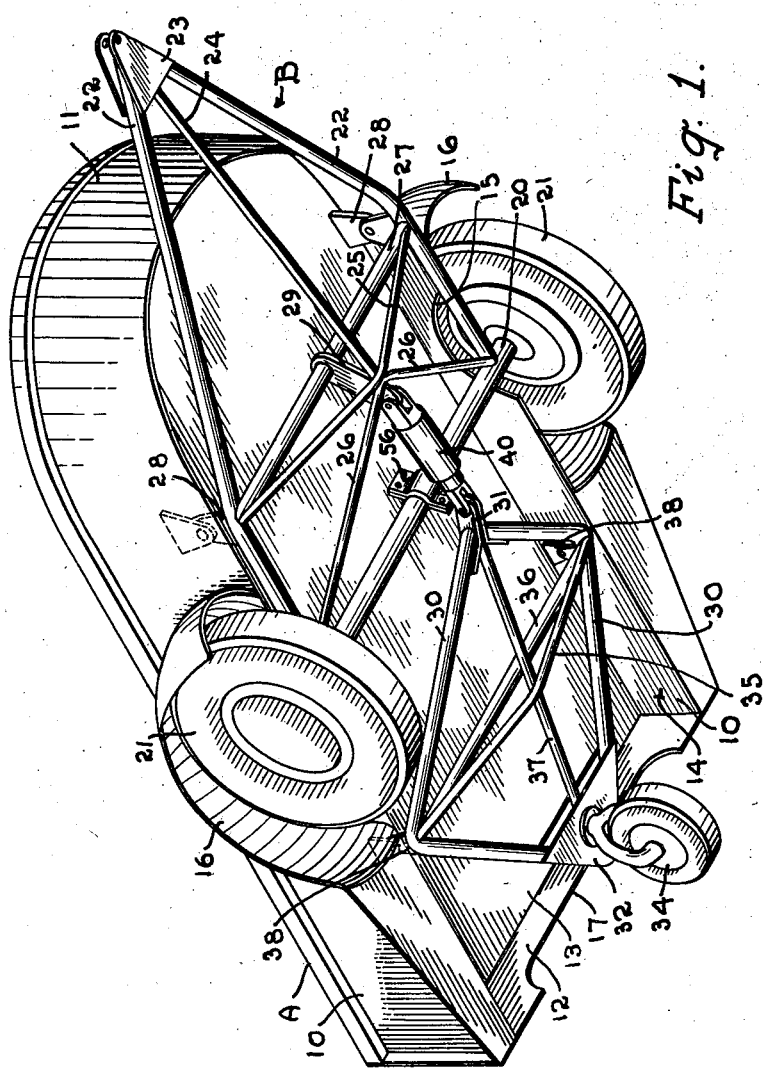

March 15, 1949. R. R. WYLAND 2,464,475
LINK-AND-LEVER ROAD VEHICLE SUSPENSION
Filed Sept. 16, 1947 4 Sheets-Sheet 3
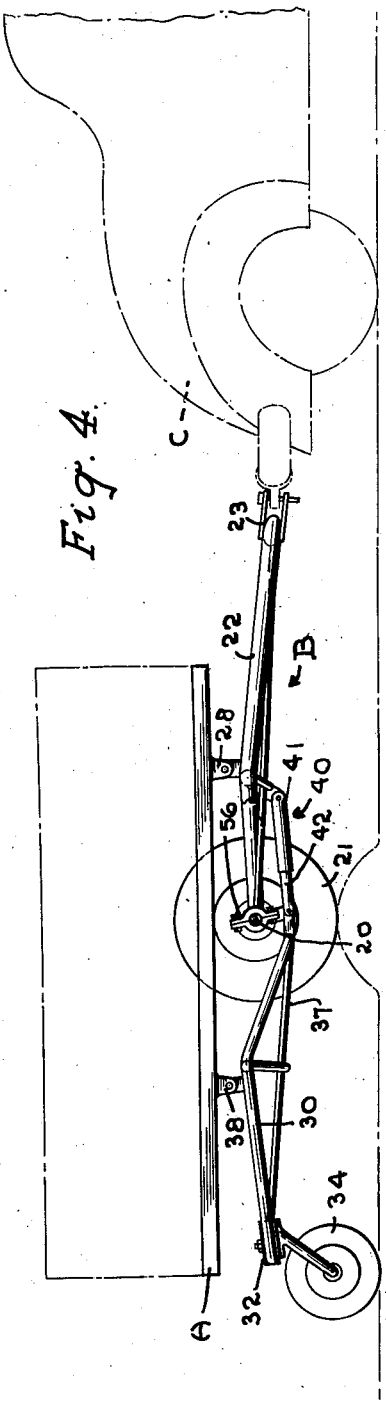
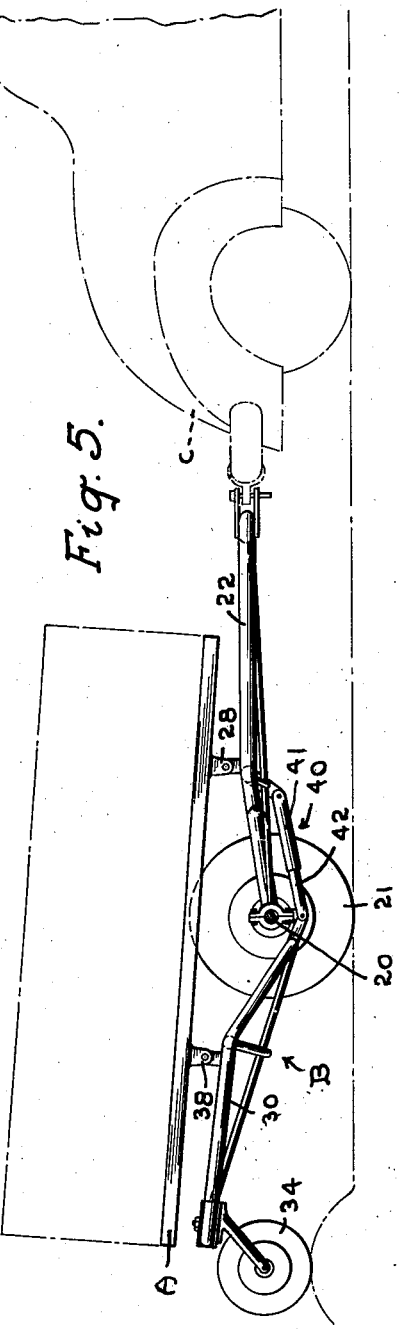
INVENTOR.
RICHARD R. WYLAND
BY
ATTORNEYS.

March 15, 1949. R. R. WYLAND 2,464,475
LINK-AND-LEVER ROAD VEHICLE SUSPENSION
Filed Sept. 16, 1947 4 Sheets-Sheet 4
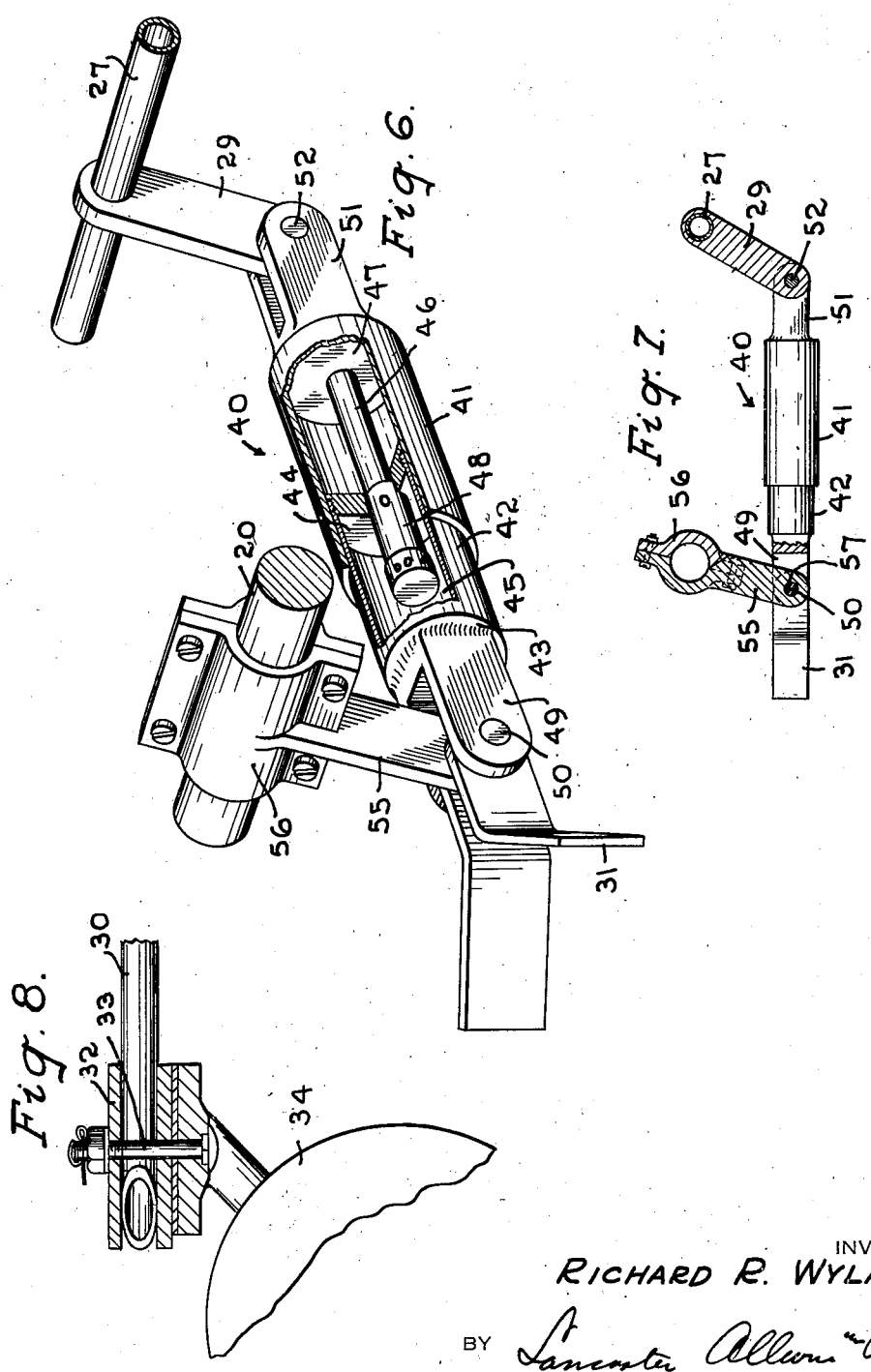
INVENTOR.
RICHARD R. WYLAND
BY
ATTORNEYS.

Patented Mar. 15, 1949

2,464,475

UNITED STATES PATENT OFFICE 2,464,475

LINK-AND-LEVER ROAD VEHICLE SUSPENSION

Richard R. Wyland, Rapid City, S. Dak.

Application September 16, 1947, Serial No. 774,342

5 Claims. (Cl. 280—104)

This invention relates to suspension means for the bodies of vehicles. An example of such a vehicle is a trailer.

Considering a trailer as an example, there are two types of trailer suspension systems in operation. These are the type wherein the body and draw-bar are fastened solidly to the running-gear, forming a rigid unit, and depending only on the elasticity of the pneumatic tires to lessen road-shocks and the type wherein the running-gear and drawbar comprise a unit, and the body structure another unit, and are joined by a system of springs. This latter system, while visibly lessening road-shocks, is susceptible to centrifugal action causing heel-over on curves and an exceptionally large amount of bouncing and rocking which, in turn, is destructive to the springs and/or differential of the towing vehicle.

An important object of this invention is to provide a suspension means which will substantially eliminate these road hazards and inconveniences.

Another important object is to provide a suspension means including two levers and a drag-link as a frame, and suspending the body of the vehicle from the frame on four hinge-points or pivots, in such manner that any bump or irregularity in the road will be "stepped over" by the trailer with little change in the position of the body.

Still another object is to provide such a suspension means which does not include springs or other parts apt to become broken nor parts so associated that they will be subjected to considerable friction.

Other objects and advantages of the invention will be apparent during the course of the following detailed description of the invention, taken in connection with the accompanying drawings, forming a part of this disclosure, and in which drawings:

Figure 1 is a perspective view of the novel suspension means, operatively attached to a vehicle body.

Figure 2 is a longitudinal section of the novel suspension means, showing a towed vehicle supported thereby and a towing vehicle attached thereto both vehicles being on a substantially level surface.

Figure 3 is a like view, but showing a change in the positions of parts of the suspension means due to the towing vehicle travelling over an uneven surface.

Figure 4 is a like view, but illustrating a change in the position of parts of the suspension means brought about by the forward or main wheels of the towed vehicle travelling over an uneven surface.

Figure 5 is a similar view, but showing the changes brought about by the caster or rear wheel of the towed vehicle travelling over an uneven surface.

Figure 6 is an enlarged perspective view of a link and shock absorber assembly, forming a part of the suspension means.

Figure 7 is a smaller view, mostly in side elevation of the assembly of Figure 6, with associated parts in section.

Figure 8 is a fragmentary view, mostly in vertical section of a connection of a caster employed in the novel suspension means, with a portion of the structure supported thereby.

In the drawings, wherein for the purpose of illustration is shown a preferred embodiment of the invention, and wherein similar reference characters designate corresponding parts throughout the several views, a vehicle body A is shown, to which is connected the novel suspension means B, which is also connected with a towing vehicle C.

The vehicle body A may be any kind to which the suspension means is applicable. In the example shown there are side walls 10, a front wall 11 and rear wall 12, extending above and below a bottom wall 13, with the compartment 14 defined by the bottom wall 13 and lower portions of the walls 10, 11 and 12. The side walls 10 may be cut into as at 15, intermediate their lengths to provide spaces for the accommodation and play of a shaft of the means B to be described. There may be provided mud guards 16, and the rear wall may be cut into as at 17 to provide a space to accommodate rear portions of the means B to be subsequently described.

The novel suspension means B includes a transversely-extending member 20 which may be an axle extending transversely of the means B and carrying spindles to which are connected the wheels 21. From the transversely-extending member 20, a tongue preferably comprises a pair of spaced-apart tongue members 22, extends forwardly; first, with the members 22 preferably in substantial parellelism and, then, converging to a suitable draft hitch portion 23. The tongue members 22 may be welded to the transversely-extending member or axle 20 and to the portion 23, and there may be provided cross braces for the tongue members 22, as at 24, 25, 26 and 27. The brace 27, which substantially parallels the member 20, has a dual function, as will be subsequently explained. Secured, as by welding, to the tongue members 22, and extending upwardly therefrom, are the lower portions of a pair of hinges 28, with the upper portions carried by the body A, as by being welded to the under side of the bottom wall 13. Secured to the brace 27, as by welding, intermediate its ends, is an arm 29 which extends downwardly and rearward for connection to a shock absorber, to be subsequently described.

Generally rearwardly of the structure 20 to 28 described, which constitutes the forward or main wheels-supported structure of the means B, which may also be termed the first wheel-supported structure, is the rear or caster-supported structure of the means B, which may also be termed the second wheel-supported structure. This includes a support, preferably made up of a pair of rearwardly-extending angular members 30 which are secured, as by welding at their forward ends, to a clevis 31, then diverge rearwardly to intermediate their lengths, whereupon they converge and are carried at their rear end portions by a caster-supporting member 32. Suitably swivelled to the member 32 for a 360° rotation, as by a pin 33 shown in Figure 8, is a caster wheel 34 which is, preferably, a small rubber-tired wheel preferably having an overall diameter substantially half the overall diameter of either wheel 21. The angular members 30 are suitably braced, as by the cross-braces 35, 36 and 37 which may be secured thereto as by welding. Extending upwardly from the angular members 30 are the lower portions of hinges 38 with the upper portions suitably secured to the body A, as to the bottom wall 13. Of course the longitudinal axes of the pivots or pintles of the hinges 28 and 38 extend transversely of the body A.

Connecting the forward or main wheels-supported structure and the rearward or caster-supported structure, is the assembly shown mainly in Figures 6 and 7, which is a shock absorber 40 of any approved kind. That, shown by way of example, includes a pair of telescoping shells 41 and 42, with the smaller-diametered shell 42 having end walls 43 and 44 which, together with its side wall, define a fluid chamber 45. Through the wall 44 extends a perforation, slidably accommodating a plunger 46 secured at its fixed end, to the end wall 47 of the shell 41, and with its free end slidable within a perforated sleeve 48 carried by the wall 44. From the outer face of the wall 43 extends a pair of perforated ears 49 for pivotal connection, as by the pin 50 with the clevis 31 and pivotal connection with an arm 55 to be subsequently described. From the outer face of the wall 47 extends a perforated pair of ears 51 for pivotal connection, as by the pin 52, with the arm 29.

With reference to the arm 55 this is secured, as by the clamp 56 to the axle 20. At its lower end portion it is provided with a perforation 57 through which extends the pin 50, whereby the rearward or caster-supported structure is pivotally coupled to both the shock absorber 40 and the axle 20 and, through the shock absorber, coupled to the forward or main wheels-supported structure.

From the foregoing it is also noted that there is but the four-point connection of body A and suspension means B, represented by the pins or pintles of the hinges 28 and 38, and the axle 20 and caster-assembly are not connected directly to the body A.

Much of the suspension means B is disposed within the compartment 14 where it is shielded and the absence of springs and similar relatively delicate parts tends to render the structure sturdy and not apt to get out of order.

When suitably coupled to a towing vehicle C, and travelling over a so-called level surface the vehicles A and C and suspension means will be disposed substantially as in Figure 2. However, when the towing vehicle C encounters a rough surface and rises, as in Figure 3, pivotal movement of the tongue members 22 upwardly, caused by rising of the rear portion of the vehicle C, will cause, in turn, operation (lengthening) of the shock absorber 40 and the well-known action thereof. There will be but slight tilting of the body A. When the towing vehicle C rolls off the rough surface, the parts will assume the positions as in Figure 2 but as the wheels 21 encounter the rough surface, as in Figure 4, pivotal movement of the tongues 22 downwardly will cause operation (shortening) of the shock absorber 40, with consequent result thereof, as well as a change in the position of the rearward or caster-supported structure of the means B, and the body A, instead of being considerably tilted, is tilted but very slightly.

Of course, as the wheels 21 roll off the rough surface, the positions of parts will be again as in Figure 2 but, when the caster 34 encounters the rough surface, there will be no undesirable tilting of the body A, as is clear from Figure 5 since, with the tilting of the rearward or caster-supported structure of the suspension means B, the forward or main wheels-supported structure moves upwardly and the relative positions of the two structures and shock absorber is substantially the same as in Figure 3.

Obviously, the suspension means described is applicable to vehicle bodies, other than trailers.

Various changes may be made to the form of the invention herein shown and described without departing from the spirit of the invention or scope of the claims.

What is claimed is:

1. In a vehicle body suspension apparatus, a forward wheel-supported structure, including a tongue and a wheel-carrying member extending transversely of said tongue and rigidly secured thereto at the inner end thereof; means hinging said structure to a vehicle body comprising two spaced-apart hinges carried by and extending upwardly from said tongue; a rearward wheel-supported structure, including a support member; means hinging said rearward structure to said vehicle body comprising two spaced-apart hinges carried by and extending upwardly from said support member, the longitudinal axes of the pintles of all said hinges extending transversely of said apparatus and in parallelism with said wheel-carrying member; and shock absorber means connecting said tongue and support member.

2. In a vehicle body suspension apparatus, a forward wheel-supported structure, including a tongue and a wheel-carrying member extending transversely of said tongue and rigidly secured thereto at the inner end thereof; means hinging said structure to a vehicle body comprising two spaced-apart hinges carried by and extending upwardly from said tongue; a rearward wheel-supported structure, including a support member; means hinging said rearward structure to said vehicle body comprising two spaced-apart hinges carried by and extending upwardly from said support member, the longitudinal axes of the pintles of all said hinges extending transversely of said apparatus and in parallelism with said wheel-carrying member; each of said tongue and support member having inner ends, with said ends adjacent each other; and shock absorber means connecting said tongue and support member at their adjacent ends.

3. In a vehicle body suspension apparatus, a forward wheel-supported structure, including a tongue and a wheel-carrying member extending transversely of said tongue and rigidly secured thereto at the inner end thereof; means hinging said structure to a vehicle body comprising two spaced-apart hinges carried by and extending upwardly from said tongue; a rearward wheel-supported structure, including a support member; means hinging said rearward structure to said vehicle body comprising two spaced-apart hinges carried by and extending upwardly from said support member, the longitudinal axes of the pintles of all said hinges extending transversely of said apparatus and in parallelism with said wheel-carrying member, each of said tongue and support members having inner ends, with said ends adjacent each other; and shock absorber means connecting said tongue and support member, said means comprising a shock absorber body with its longitudinal axis transverse to the longitudinal axis of said wheel-carrying member and the longitudinal axis of said pintles.

4. In a vehicle body suspension apparatus, a forward wheel-supported structure including a two-part tongue, a wheel-carrying member extending transversely of said tongue and rigidly secured thereto, a cross brace connecting the two parts of said tongue, and an arm secured to and extending downwardly from said cross brace; means hinging said structure to a vehicle body, comprising two hinges, with one leaf of each carried by a vehicle body and the other leaf of each carried by said tongue; a rearward wheel-supported structure, including a support member extending longitudinally of said apparatus and a wheel operatively carried by said support member; means hinging said rearward structure to said vehicle body, comprising two hinges, with one leaf of each carried by said body and the other leaf of each carried by said support member, the longitudinal axes of the pintles of all of said hinges extending transversely of said apparatus and in parallelism with said wheel-carrying member; an arm secured to said wheel-carrying member and extending downwardly therefrom and with its free end adjacent the inner end of said support member; and a shock absorber, including two portions, one movable toward and away from the other, with the outer end of one portion pivotally carried by said support member and second arm, and the outer end of the other portion pivotally carried by said first arm.

5. In a vehicle body suspension apparatus, a forward, wheel-supported structure, including a two-part tongue, a wheel-carrying member extending transversely of said tongue and rigidly secured thereto, a pair of ground wheels rotatably carried by said member, a cross brace connecting the two parts of said tongue, and an arm secured to and extending downwardly from said cross brace; means hinging said structure to a vehicle body, comprising two hinges, with one leaf of each carried by a vehicle body and the other leaf of each carried by said tongue; a rearward, wheel-supported structure, including a support member extending longitudinally of said apparatus and a caster wheel operatively carried by said support member; means hinging said rearward structure to said vehicle body, comprising two hinges, with one leaf of each carried by said body and the other leaf of each carried by said support member, the longitudinal axes of the pintles of all of said hinges extending transversely of said apparatus and in parallelism with said wheel-carrying member; an arm secured to said wheel-carrying member and extending downwardly therefrom and with its free end adjacent the inner end of said support member; and a shock absorber, including two portions, one movable toward and away from the other, with the outer end of one portion pivotally carried by said support member and second arm, and the outer end of the other portion pivotally carried by said first arm.

RICHARD R. WYLAND.

REFERENCES CITED

The following references are of record in the file of this patent:

UNITED STATES PATENTS

| Number | Name | Date |
| --- | --- | --- |
| 2,361,496 | Pointer | Oct. 31, 1944 |